Patented Jan. 2, 1951

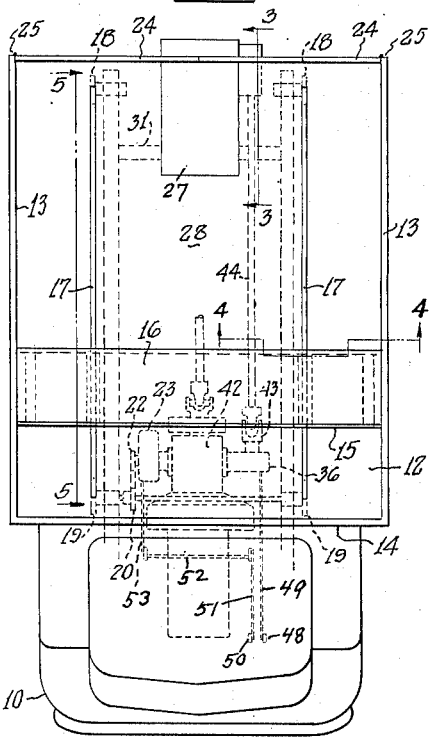
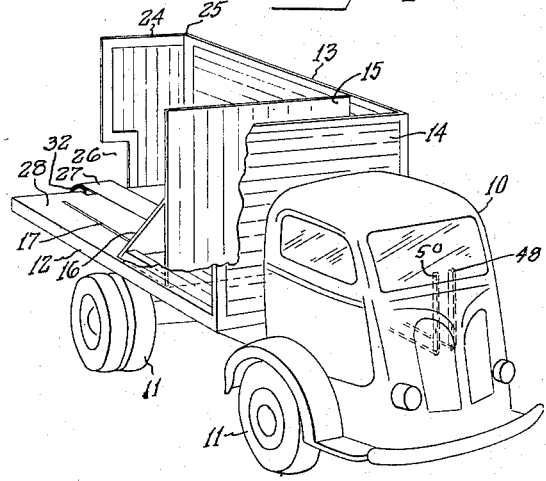
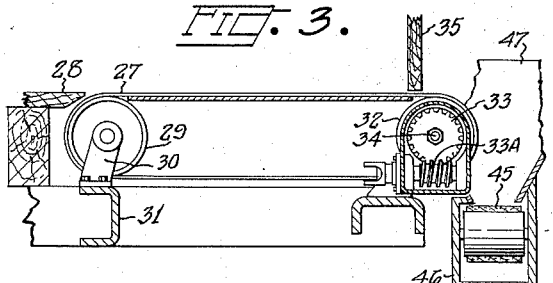
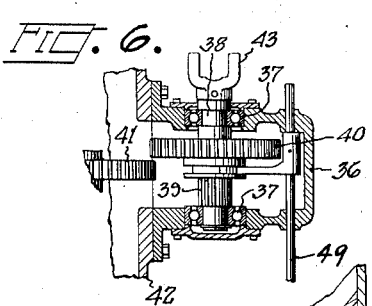
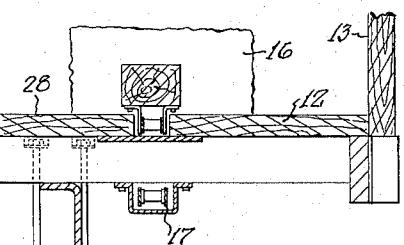
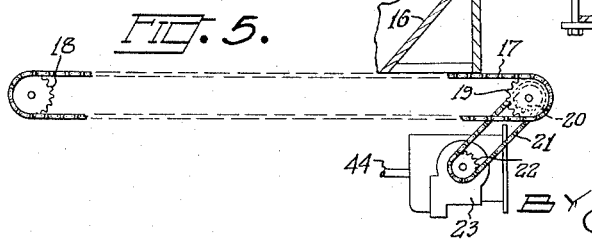

2,536,476

UNITED STATES PATENT OFFICE 2,536,476

SAWDUST HANDLING TRUCK AND CONVEYER

Herried L. Thompson, Portland, Oreg.

Application January 11, 1949, Serial No. 70,159

1 Claim. (Cl. 214—83.36)

This invention relates generally to the handling of sawdust and similar materials and particularly to a truck having a delivering conveyor, by means of which a load can be discharged in a steady stream.

The main object of this invention is to provide the common form of truck having a ram type of front end gate and outwardly hinged tail gate with a fixed tail end gate having an opening therein and a conveyor on the bottom of the truck for discharging contents through said opening.

The second object is to devise a truck body especially adapted to the delivery of sawdust from a truck in a manner that it may be conveyed in any direction as rapidly as it is discharged from the truck instead of being first dumped on the ground or to be limited in its direction of delivery.

The third object is to overcome the loss of time and manpower which ordinarily form a large portion of the cost when sawdust is used as fuel.

I accomplish these and other results in the manner set forth in the following specification as illustrated in the accompanying drawing, in which:

Fig. 1 is a perspective view of a truck with portions of the body broken away.

Fig. 2 is a plan view of the truck.

Fig. 3 is an enlarged fragmentary section taken along the line 3—3 in Fig. 1.

Fig. 4 is a fragmentary section taken along the line 4—4 in Fig. 1.

Fig. 5 is a fragmentary section taken along the line 5—5 in Fig. 2.

Fig. 6 is a horizontal section through the shifting mechanism.

Like numbers of reference refer to the same or similar parts throughout the several views.

Referring in detail to the drawing, there is shown a common form of truck 10 on whose wheels 11 is mounted the bed 12 having the usual sides 13 and head end gate 14, behind which is mounted a movable head gate 15 having a sloping rear side 16 which, together with the end gate 15, can be moved by means of the endless chains 17 which pass around the sprocket wheels 18 and 19, the latter being secured on the same shaft with the smaller sprocket wheel 20 whose chain 21 passes around the sprocket wheel 22 on the speed reduction mechanism contained within the casing 23. The end gate members 15 and 16 are mounted on the chains 17 and are propelled thereby in order to move the entire load of sawdust toward the tail gates 24 which are normally hinged along the vertical corners 25. The gates 24 have their lower adjacent corners cut out to form an opening 26, through which extends a conveyor belt 27, the top of which is level with the deck 28 of the bed 12.

The belt 27 is carried by an idler pulley 29 which is mounted on the standards 30 supported by the cross channel 31 and also by a drive pulley 32 which, together with the worm wheel 33, are secured on the shaft 34, and the worm wheel 33 is driven by a worm 33—A on the shaft 44. A suitable door 35 is provided for the opening 26.

Within the housing 36 are mounted the antifriction bearings 37, within which journals the power take-off shaft 38, on whose splined portion 39 is slidably mounted a gear 40 which can be brought into mesh with a transmission gear 41 contained within the housing 42. A universal coupling 43 connects the shaft 44 with the speed reduction in the housing 36.

If desired, a separate conveyor 45 mounted on the frame 46 and provided with a hopper 47 may be employed to carry the discharge from the conveyor belt 27 in any desired direction.

It can be seen from the foregoing that as the sawdust is moved toward the rear end of the truck, it is taken away from its under side and discharged in a steady stream instead of dumped as is commonly the case.

The advantage gained arises from the ability to unload the entire load at a precise spot and in a continuous stream, thereby lending itself to use with auxiliary conveyors, thereby rendering unnecessary the need of extra labor which must be transported from place to place for relatively small jobs of putting the unloaded sawdust into basements or storage bins.

When used without my conveyor 27, the hinged tail gates open wide during the unloading. With my device, the gates 24 are left closed and only the door 35 is opened to permit the discharge of the sawdust, which relieves the pressure being built up against the gates 24 by the backward movement of the head gate 15.

In order to make the device operable from the cab of the truck 10, I have provided a control lever 48 which is connected by the rod 49 to the chain gear 40 in the housing 36, by means of which the conveyor 27 is operated.

Also in the cab is a hand lever 50 which, through the connecting rod 51, rock shaft 52 and the rod 53, controls the operation of the endless chains 17. The two hand levers 48 and 50 and their attached parts make the conveyor 27 and chains 17 operable separately or in unison.

I claim:

A sawdust carrying truck including a rectangular truck body having four upright sides and having an auxiliary head end gate inside of its front end, having a downwardly sloping rear side, a pair of block chains mounted in said body with their top runs extending through the body floor, said head end gate and sloping side being mounted on said chains, a belt conveyor mounted below said body at its rear end with the top run of the belt at the top level of the body floor, means for driving said conveyor independently of said head gate whereby sawdust may be discharged through the tail gate by said belt conveyor.

HERRIED L. THOMPSON.

REFERENCES CITED

The following references are of record in the file of this patent:

UNITED STATES PATENTS

| Number | Name | Date |
|---|---|---|
| 754,899 | Seaver et al. | Mar. 15, 1904 |
| 1,019,952 | Cregor | Mar. 12, 1912 |
| 1,255,052 | Randall | Jan. 29, 1918 |
| 1,717,843 | Hollnagel | June 18, 1929 |